United States Patent [19]

Gohara et al.

[11] Patent Number: 5,494,614
[45] Date of Patent: Feb. 27, 1996

[54] WET FLUE GAS DESULFURIZATION SCRUBBER IN SITU FORCED OXIDATION RETROFIT

[75] Inventors: Wadie F. Gohara, Barberton; Steve Feeney, Norton, both of Ohio

[73] Assignee: The Babcock & Wilcox Company, New Orleans, La.

[21] Appl. No.: 247,782

[22] Filed: May 23, 1994

[51] Int. Cl.⁶ .................................................. B01F 3/04
[52] U.S. Cl. ............................................................ 261/124
[58] Field of Search ............................................. 261/124

[56] References Cited

U.S. PATENT DOCUMENTS 1,653,454  12/1927  Frattallone ............................ 261/124
3,081,239  3/1963  Clauss et al. ......................... 261/124
3,649,529  3/1972  Walker .................................. 261/124
4,549,997  10/1985  Verner et al. ........................ 261/124
4,563,277  1/1986  Tharp .................................... 261/124
4,655,242  4/1987  Hamazaki et al. ..................... 261/124

FOREIGN PATENT DOCUMENTS 1329087  4/1963  France ................................. 261/124
2450837  4/1975  Germany .
231576  4/1925  United Kingdom ................... 261/124

*Primary Examiner*—Tim R. Miles
*Attorney, Agent, or Firm*—Daniel S. Kalka; Robert J. Edwards

[57] ABSTRACT

A in-situ forced oxidation system is retrofitted into a wet FGD (flue gas desufurization) scrubber with no vessel penetrations below the water line of the scrubber and no additional load on the scrubber walls.

10 Claims, 4 Drawing Sheets

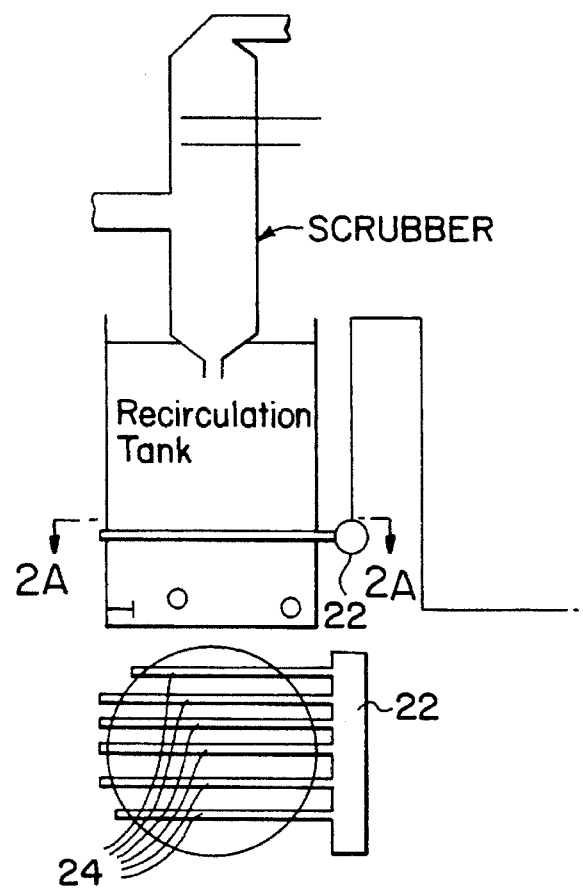
FIG. 2
PRIOR ART
FIG. 2A
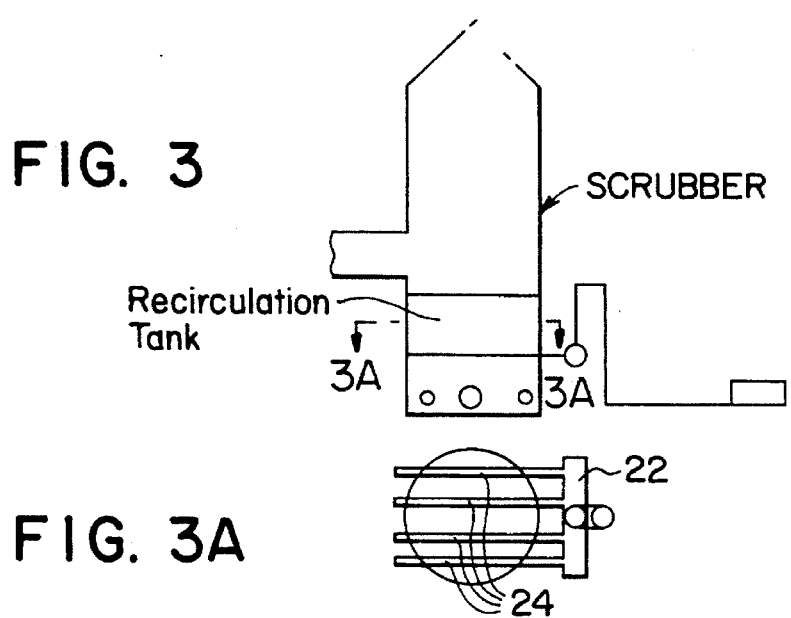
FIG. 3
FIG. 3A

WET FLUE GAS DESULFURIZATION SCRUBBER IN SITU FORCED OXIDATION RETROFIT

BACKGROUND OF THE INVENTION

1. Field of the Invention

The present invention relates generally to wet FGD scrubbers and in particular to an in-situ forced oxidation retrofit for same.

2. Description of the Related Art

Typical wet (FGD) flue gas desulfurization scrubbers consist of two major components: the scrubbing zone in which the actual gas scrubbing takes place and a recirculation tank to allow efficient utilization of the reagent. The majority of these systems are single loop systems in which the recirculation tank and the scrubbing zone are combined in one structure. The liquor sprayed in the scrubbing zone captures sulfur dioxide ($SO_2$) forming sulfites and bisulfites. These systems run free of scale if the oxidation of sulfites to sulfates was kept below 15% or above 85%. One means of controlling scale formation in an FGD system was to force oxidize the sulfites to sulfates by bubbling air through the recirculated reagent.

Systems built more than a decade ago used to oxidize sulfites by bubbling the air through the reagent in a separate tank. The formed sulfates were separated and disposed of. These systems were referred to as ex-situ forced oxidation systems. Other systems bled a slip stream from the recirculation tank, bubbled air through the reagent slurry to oxidize the sulfites then returned it back to the recirculation tank. These systems were intermediate between the ex-situ and the more advanced in-situ oxidation systems.

Today wet scrubbers are built with the preferred means of achieving oxidation, namely performing the forced oxidation in the recirculation tank of the wet scrubber itself. This process is referred to as full in-situ oxidation and FIG. 1 depicts such a system.

In prior art FGD scrubbers, some absorbers and tanks were made of either high alloy expensive material to fight corrosion, or were made of lined carbon steel material, which is inexpensive but susceptible to corrosion and chemical attack without the use of liner materials. Liners are usually made of rubber, fiberglass, or wall paper alloys to protect the carbon steel shell from the corrosive action of the chemicals inside the tank.

Some of these prior art wet scrubbers were built and installed without the forced oxidation system being located in the recirculating tank. Retrofitting these systems to an in-situ forced oxidation system required that air be delivered and bubbled through the recirculation tank contents to achieve oxidation. Air was bubbled into the tank using sparge pipes. FIGS. 2 and 3 show such retrofits for wet scrubbers with either integral or separate recirculation tanks. These retrofits had sparge pipes penetrate the side of the tank which were supported on the opposite wall of the tank. This arrangement called for multiple wall penetrations which were particularly not welcomed in instalations using lined vessels since breaking the integrity of the liner developed areas of corrosive reagent interaction with the carbon steel under the liner. Also multiple penetrations required external space where the main air header from the compressor was located. While this arrangement is viable for new installation where equipment arrangement is not limited by existing equipment, for retrofit projects, the optimum orientation of the sparge headers usually does not fall in line with the space requirements for outside pipe routing from the compressor to the sparge pipes.

Thus it is seen that while newly built in-situ forced oxidation wet FGD scrubbers are not problem prone, the retrofit of natural oxidation wet scrubbers was fraught with problems and difficulties.

SUMMARY OF THE INVENTION

The present invention solves the mentioned problems associated with prior art retrofits as well as others by providing an in-situ forced oxidation retrofit for prior art natural oxidation wet FGD scrubbers in which the sparge pipes delivering the oxidizing air are mounted inside the absorber tank making either one or no penetrations of the tank wall nor adding any loads on the walls of the tank or vessel. This retrofit arrangement also allows a dissociation of the orientation of the main air pipe from the orientation of the sparge pipes. The orientation of the sparge pipes is usually dictated by the presence of mixers, access doors, and recirculation pumps and intake pipes of the existing wet scrubber installation.

The retrofit system consists of a main air header that feeds the sparge pipes. This header connects the compressor or source of compressed air to the sparge pipes in the tank. The main air header forms a loop that extends above nhe liquid level in the tank, forming an upflow leg of the main air header. The upflow leg of the main header prevents back flow of the tank contents to the compressors. This is more reliable than the use of check valves used in some installations.

In view of the foregoing it will be seen that one aspect of the present invention is to provide an in-situ forced oxidation retrofit for a wet FGD scrubber having no more than one wall penetration.

Another aspect of the present invention is to provide such a retrofit with no wall penetrations below the water line of the recirculation tank of the wet scrubber.

Yet another aspect of the present invention is to provide such a mentioned retrofit which does not impose any additional loads on the walls of the wet scrubber.

Still yet another aspect of the present invention is to provide such a mentioned retrofit which does not require large area external of the wet scrubber to install the retrofit.

These and other aspects of the present invention will be more fully understood upon a review of the following description of the preferred embodiment when considered in conjunction with the accompanying drawings.

BRIEF DESCRIPTION OF THE DRAWINGS

FIG. 2 is a side view of a wet FGD scrubber with an open recirculating tank fitted with a prior art in-situ forced oxidation retrofit.

FIG. 2a is a top view of the sparge pipe location of the FIG. 2 retrofit taken along section A—A.

Fig. 3 is a side view of a wet FGD scrubber with an integral recirculation tank fitted with a prior art in-situ forced oxidation retrofit.

FIG. 3a is a top view of the sparge pipe location of the FIG. 3 retrofit taken along section B—B.

DESCRIPTION OF THE PREFERRED EMBODIMENT

Figure 1:
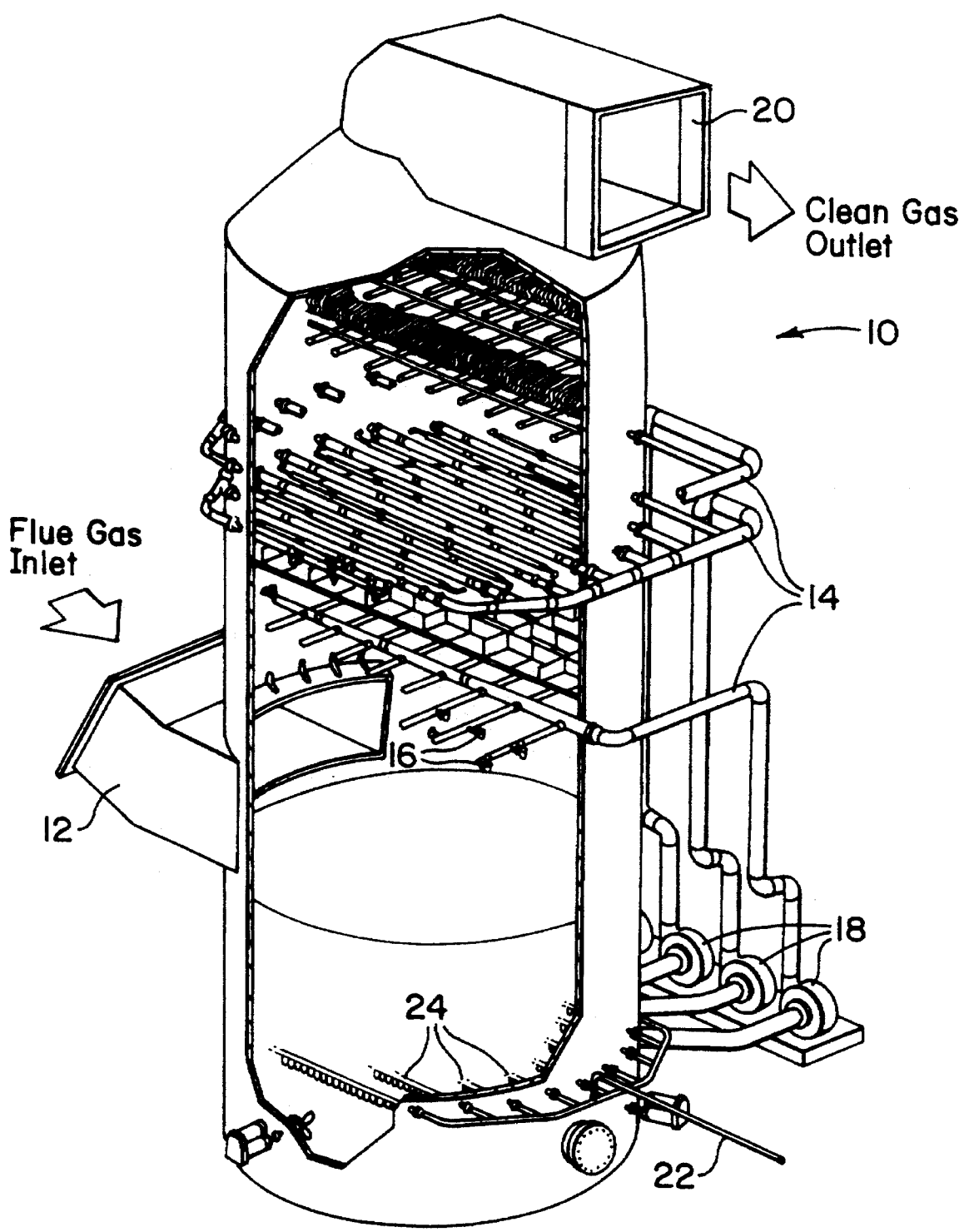
FIG. 1 is a perspective view of a presently built wet FGD scrubber providing in-situ forced oxidation.

Turning now to the drawings where the showings are intended to depict a preferred embodiment of the present invention and not to limit it thereto, a brief review of prior art wet FGD scrubber in-situ forced oxidation retrofit is depicted in FIGS. 2 and 3 as well as a new construction in-situ forced oxidation wet FGD scrubber in FIG. 1 is depicted to allow a better appreciation of the present invention.

In FIG. 1, there is shown an in-situ forced oxidation wet FGD (flue gas desulfurization) scrubber 10 built today. Flue gas enters the scrubber at an inlet 12 located above the recirculating tank and is passed through the scrubbing zone consisting of a series of nozzle levels 14 having a plurality of nozzles 16 which spray liquid reagent recirculated from the recirculating tank by pumps 18. The intimate contact of the spray with the flue gas stream transfers suspended particles in the flue gas stream to the liquid which falls back to the recirculating tank. Additionally the liquid performs other process functions such as gas absorption, chemical reaction and heat transfer.

Sulfur oxides are produced in significant quantity by combustion of coal or fuel oil. These oxides are removed by the liquid spray from the flue gas before it is exhausted to a stack (not shown) through an outlet 20. In these situations the liquid reagent is usually lime, lime stone, alkaline fly ash with supplemental lime or sodium carbonate with dilute sulfuric acid. The liquid reagent when contacted by sulfur dioxide $SO_2$ looses its alkalinity and forms sulfites and bisulfites. To maintain the recirculation tank free of scale the sulfites must be oxidized to sulfates. This oxidation is accomplished by forcing air to a header 22 from a pump (not shown) which is distributed to a series of perforated sparge pipes 24 located in the recirculation tank to allow air to be bubbled therein to force oxidize the sulfites to sulfates in the tank reagent.

This described new construction installation offers no problem since the scrubber is constructed to fit an allocated space and arrives factory lined.

However, there exist numerous naturally oxidized systems with a lined tank some of which which were converted to an in-situ oxidation. Examples of such systems and their retrofitted conversions are seen in FIGS. 2 and 3. The recirculation tanks of these systems are either integral to the structure of the absorption zone as shown in FIG. 3, or are separate from the absorption zone but located under it as shown in FIG. 2. In either case, air had to be delivered and bubbled through the tank contents to achieve oxidation. Air was bubbled into the liquid reagent using sparge pipes 24. The pipes were made to penetrate the sides of the scrubber tank and were supported from the opposite wall of the tank. These retrofit arrangements required multiple wall penetrations which were particularly not welcomed in lined vessels. Also multiple penetrations required external space where the main air header 22 was located. For retrofit projects, the optimum orientation of the sparge headers usually did not fall in line with space requirements for outside pipe routing from the compressor to the sparge pipes. The cutting and modifying of lined tanks breaks the integrity or the liner and creates the potential for corrosion and structural damage to the vessel's metallic shell at the relined connection. It is therefore an advantage to be able to fit the required equipment into a given vessel with minimum or no cutting into the integrity of the existing liners and even then the cutting should not be below the water level of the tank.

Figure 4:
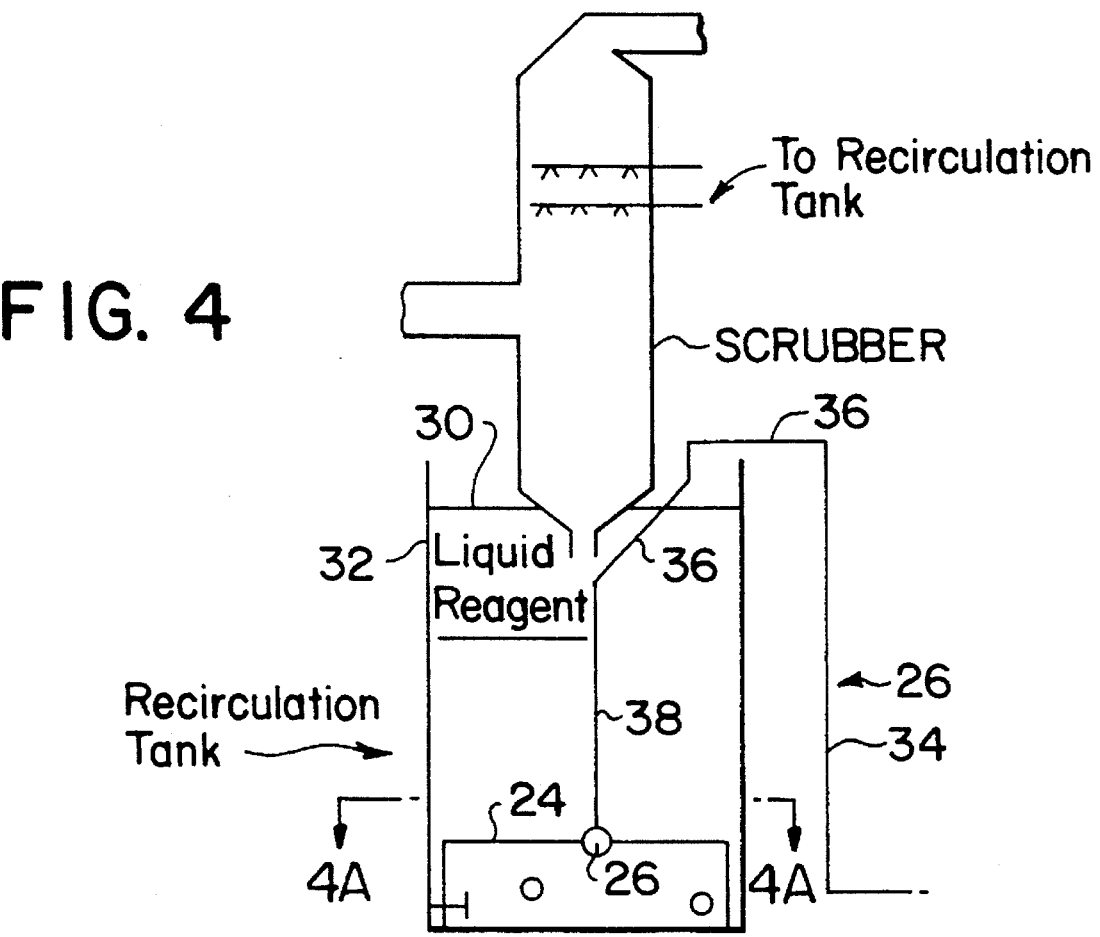
FIG. 4 is a side view of a wet FGD scrubber with an open tank fitted with an in-situ forced oxidation retrofit of the present invention.
Figure 4A:
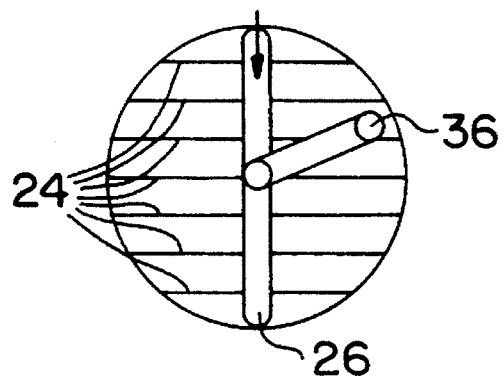
FIG. 4a is a top view of the sparge pipe location of the FIG. 4 retrofit taken along section C—C.
Figure 5:
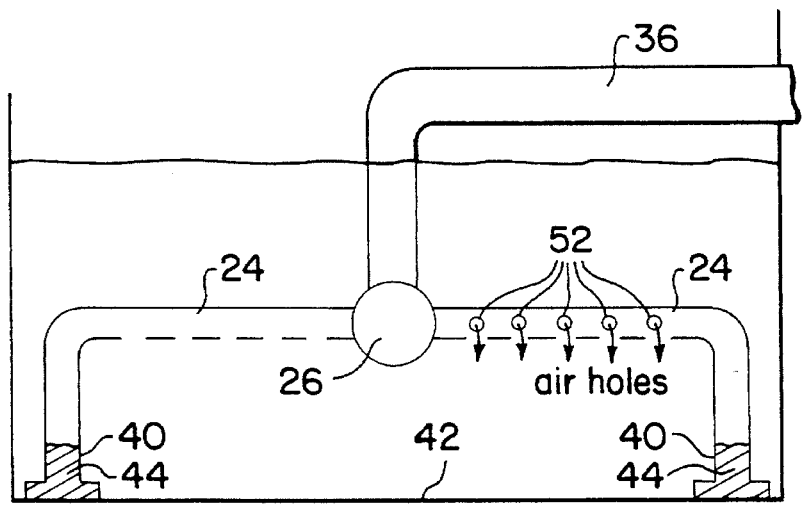
FIG. 5 is a detailed side view of the recirculating tank of the FIG. 4 retrofit showing the sparge pipe support legs and air feed lines.

In FIG. 4, there is a retrofit system of the present invention in which the sparge pipes 24 are mounted inside the absorber tank without making any penetrations below the water line, or impingement on the walls of the tank or vessel. The arrangement also provides means to dissociate the orientation of a main air pipe 26 from the orientation of the sparge pipes 24. The orientation of the sparge pipes 24 is usually dictated by the presence of mixers, access doors, and recirculation pump intake pipes.

The retrofit is shown for a open tank 32 scrubber and consists of a main air header assembly 26 that feeds the sparge pipes 24. This header assembly 26 connects the compressor or source of compressed air (not shown) to the sparge pipes 24 in the tank 32. The main air header assembly 26 forms a loop that extends above the liquid level 30 in the tank 32 forming an upflow leg 34 of the main air header assembly 26. The upflow leg 34 of the main header assembly 26 prevents back flow of the tank contents to the compressors. This feature was found to be more reliable than the use of known check valves.

The upflow leg 34 extends up above the water level 30 to connect to a transition leg 36 which extends into the tank 32 and clears the scrubber to connect to a downflow leg 38 connected to the main air header 26. The sparge pipes connected thereto have holes therein to bubble air through the liquid reagent in the tank 32 to thereby force oxidize the sulfites therein to sulfates.

In scrubbers where the tank 32 is integral with the absorption zone of the scrubber as seen in FIG. 3, the main header 26 penetrates the tank 32 at only one location above the maximum tank liquid level. The penetration could be made at any position around the circumference of the tank without regard to the final sparge pipes 24 orientation. Thus the retrofit would be as seen in FIG. 4 but replacing the prior art FIG. 3 retrofit. The main header pipe assembly 26 would then be routed above the tank wall. This routing would form the loop previously described for the integrated system. Once more the direction from which the main header assembly 26 enters the tank would be totally independent of the final arrangement and orientation of the sparge pipes 24.

In both the open tank and integrated tank retrofit, the main header assembly 26 upflow leg 34 is routed inside the tank to form the transitional leg 36. The transitional leg 36 is routed along an incline horizontal to the center of the tank. At the center, the transitional leg 36 is directed downward to a proper elevation, to form the downflow leg 38 of the loop, where the sparge pipes 24 would be located between the tank liquid level and the tank floor. The elevation of the sparge pipes 24 ranges from 12 to 25 feet under the normal operating level in the tank and 2 to 15 feet above the floor of the tank. The first set of dimensions is set by the kinetics of the process and the second set is set by the need to avoid highly turbulent flow currents near the floor of the tank.

At the proper elevation inside the tank, the down flow leg 38 of the main header assembly 26 branches to form the main air header feeding the sparge pipes 24. The orientation of this main header 26 can obviously be made independent of the directions from which the main header transitional leg 36 crosses the tank domain. The sparge pipes 24 extend at the center line of the tank 32 from one wall to the other of the tank 32. The pipe is then bent downward, at both ends near the tank wall, to form a support post 40 resting on the floor 42 of the tank 32. The sparge pipe 24 supports 40 are filled with concrete, scrubber sludge or an appropriate material to prevent buoyancy of the header 26 and sparge pipes 24 when air passes through them.

Stabilizers and ties between the sparge pipe legs may sometimes become necessary, however, the whole retrofit structure inside the tank 32 rests on the tank floor 42 without any loading or strain on the tank walls.

Figure 7:
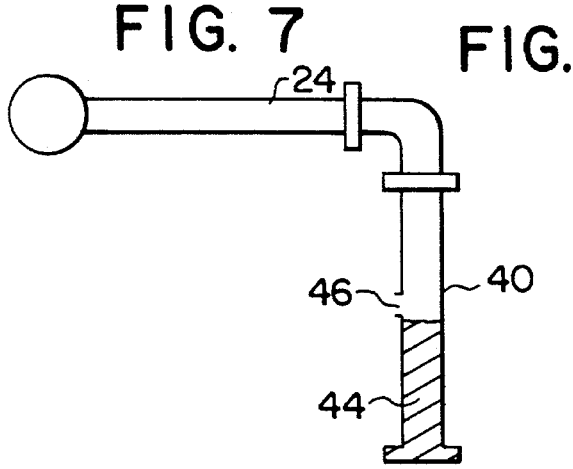
FIG. 7 is a side view of a support leg for deep recirculation tanks.
Figure 6A:

In deep tanks the sparge pipes 24 are more than 5 to 10 feet above the bottom of the tank 32, the support leg 40 is then made of a single walled pipe as seen in FIG. 7. A vent 46 is located in the support leg 46 at an elevation high enough to provide a liquid seal greater than the design pressure drop across the sparge pipe 24 holes. The bottom portion of the support leg under the vent 46 is filled with concrete, scrubber sludge or any appropriate material to prevent buoyancy of the header 26 and sparge pipes 20 when air passes through, or the support posts may be anchored to the tank floor.

Figure 6:
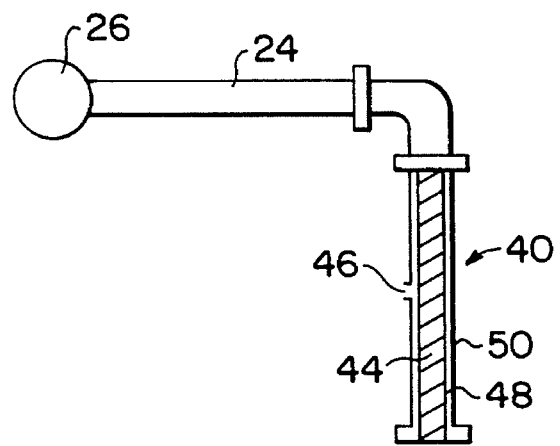
FIG. 6 is a side view of a support leg for shallow recirculation tanks.

In shallow tanks the sparge pipes 24 are located 2 to 5 feet above the tank floor. The support will be made of two concentric pipes as seen in FIG. 6. An inner pipe 48 supports the main sparge pipes 24, and is filled with concrete, absorber sludge, or any other convenient material to prevent buoyancy of the header and sparge pipes system when air passes through. An outer pipe 50 remains hollow and vents into the tank 32. The vent 46 is located in such a manner to offer a liquid resistance greater than the sparge pipe design pressure drop so that during normal operation air would not escape into the tank through the vent 46. If the sparge holes 52 plug up for any operation related reason, the air pressure would force the liquid seal out of the vent then air would be vented into the tank 32 providing oxidation air for the process and protecting the compressor.

In view of the foregoing it is seen that the retrofit of the present invention is easily adaptable to lined and non-lined systems and provides the following advantages:

1. Penetrations or manipulation of lined tank walls is minimized or eliminated.
2. The direction of the sparge pipes inside the tank is made independent of the main header routing or orientation.
3. Does not impose any additional loads on the tank walls since all the loads are routed to the floor of the tank.
4. Several level of sparge pipes could be placed in the same tank using one penetration through the walls.
5. Does not require large areas external to the tank to route the header system.
6. Provides contingent air sparging through vents in case of sparge holes plugging to provide compressor protection.

Certain modifications and improvements have been deleted herein for the sake of conciseness and readability but are intended to be included within the scope of the following claims.

What is claimed is:

1. An in situ forced oxidation system for a wet flue gas desulfurization scrubber having a scrubber zone located above a recirculating tank, comprising:

a series of sparge pipes located in the recirculating tank for bubbling air into the recirculating tank;

a header assembly connected to said series of sparge pipes for supplying air thereto;

air supply means for connecting pressurized air to said header assembly without penetrating any scrubber walls below the normal liquid level in the recirculating tank of the scrubber; and a support leg connected to said series of sparge pipes for supporting said series of sparge pipes on the bottom of the recirculation tank without penetrating any walls of the recirculation tank, said support leg connected to a sparge pipe to extend down along the wall of the recirculating tank to the bottom thereof to support the sparge pipe thereon, said support leg having a hollow portion filled with material preventing buoyancy of the sparge pipe.

2. An in-situ system as set forth in claim 1 wherein said scrubber has an open recirculation tank with the scrubber zone located on top of the recirculating tank and said air supply means includes an air supply assembly having an upflow leg extending along the outside of the recirculation tank connected to a transition leg extending across the top of the recirculation tank and into the liquid in the recirculation tank to connect to a downflow leg connected to said header assembly.

3. An in situ system as set forth in claim 1 wherein said support leg has a vent hole for venting the air in said sparge pipe in the event the air is blocked from bubbling through said sparge pipe.

4. An in situ system as set forth in claim 1 wherein said series of sparge pipe all have a support leg extending down to the bottom of the recirculation tank.

5. An in situ system as set forth in claim 1 wherein said support leg includes a pair of concentric tubes with the internal tube filled with the material to prevent buoyancy of the sparge pipe and the external tube communicating with the air in said sparge pipe.

6. An in-situ system as set forth in claim 5 wherein said external tube has a vent hole therein.

7. An in situ system as set forth in claim 1 wherein said material is concrete.

8. An in-situ system as set forth in claim 7 wherein said support leg has a vent hole located directly above the concrete level of said support leg.

9. A support for sparge pipes of an in situ force oxidation system; comprising:

a wet scrubber having a recirculation tank with sparge pipes located therein for bubbling air through the recirculation tank; and a support leg for supporting the sparge pipes on the bottom of the recirculation tank of said wet scrubber without penetrating any of the walls of the recirculation tank, said support leg being connected to the sparge pipe to extend down along the wall of the recirculating tank to the bottom thereof to support the sparge pipe thereon, said support leg having a hollow portion filled with material preventing buoyancy of the sparge pipe.

10. A support as set forth in claim 9, wherein said scrubber has an open recirculation tank with a scrubber zone located on top of the recirculating tank and air supply means that includes an air supply assembly having an upflow leg extending along the outside of the recirculation tank connected to a transition leg extending across the top of the recirculation tank and into the liquid in the recirculation tank to connect to a downflow leg connected to said header assembly.

* * * * *